United States Patent
Chen et al.

(10) Patent No.: US 6,775,132 B2
(45) Date of Patent: Aug. 10, 2004

(54) MOUNTING APPARATUS FOR DATA STORAGE DEVICE

(75) Inventors: Jung-Chi Chen, Tu-Chen (TW); Jian Hu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 23 days.

(21) Appl. No.: 10/330,405

(22) Filed: Dec. 27, 2002

(65) Prior Publication Data

US 2004/0047122 A1 Mar. 11, 2004

(30) Foreign Application Priority Data

Sep. 9, 2002 (TW) ..................................... 91214020 U

(51) Int. Cl.⁷ ................................................ G06F 1/16
(52) U.S. Cl. .................... 361/685; 361/724; 312/223.1; 312/223.2; 369/75.1
(58) Field of Search ............................... 361/683, 685, 361/724–727; 312/223.1–223.2; 369/75.1

(56) References Cited

U.S. PATENT DOCUMENTS

| | | | | |
|---|---|---|---|---|
| 5,680,293 A | * | 10/1997 | McAnally et al. | 361/685 |
| 5,768,099 A | * | 6/1998 | Radloff et al. | 361/685 |
| 6,141,222 A | * | 10/2000 | Toor et al. | 361/726 |
| 6,445,663 B1 | * | 9/2002 | Chen et al. | 369/75.1 |

* cited by examiner

Primary Examiner—Darren Schuberg
Assistant Examiner—Anthony Q. Edwards
(74) Attorney, Agent, or Firm—Wei Te Chung

(57) ABSTRACT

A data storage device mounting apparatus includes a drive bracket (10) and a cover (20). The drive bracket includes a first side plate (14) and a second side plate (16). The first side plate defines two slots (140), and includes two first positioning pins (144) engaging in positioning holes (32) of one side of a data storage device (30). The second side plate defines two through holes (164), and includes a catch bar (160). The cover includes a main body (21) having a first edge portion (25) and a second edge portion (27). The first edge portion includes two tabs (22) engaging in the slots respectively. The second edge portion includes a latch hook (282) resiliently engaging with the catch bar, and two second positioning pins (264) extending through the through holes and engaging in positioning holes (32) of an opposite side of the data storage device.

16 Claims, 4 Drawing Sheets

US 6,775,132 B2

MOUNTING APPARATUS FOR DATA STORAGE DEVICE

BACKGROUND OF THE INVENTION

1. Field of the Invention

The present invention relates to a computer enclosure, and particularly to a computer enclosure having a mounting apparatus for readily attaching a data storage device in the enclosure.

2. Related Art

When a conventional computer is assembled, a drive bracket is firstly mounted in a computer enclosure. Data storage devices such as a hard disk drive (HDD), a floppy disk drive (FDD) and a compact disk read only memory (CD-ROM) drive are then attached to the drive bracket.

The drive bracket is typically secured to the computer enclosure by riveting or using a plurality of screws. U.S. Pat. No. 5,447,367 discloses a conventional drive bracket which is attached to a computer enclosure with screws. A screwdriver is required. This is inconvenient and time-consuming, and particularly costly in mass production facilities. Furthermore, during assembly, extra operation space for manipulating the screws is needed. This militates against the modern trend toward reducing the size of a computer. Moreover, screws can be accidentally lost during assembly. Similar problems are experienced when rivets are used instead of screws. A riveter is required, and extra operation space for manipulating the rivets is needed. Rivets can be accidentally lost during assembly.

Thus an improved mounting apparatus for data storage devices which overcomes the above-mentioned problems is desired.

SUMMARY OF THE INVENTION

Accordingly, an object of the present invention is to provide a mounting apparatus for easy and convenient installation or removal of data storage devices into or from a computer enclosure.

Another object of the present invention is to provide a mounting apparatus which does not require additional fasteners for attachment of a data storage device in a computer enclosure.

To achieve the above-mentioned objects, a data storage device mounting apparatus in accordance with a preferred embodiment of the present invention includes a drive bracket mounted to a chassis of a computer, and a cover for attaching to the drive bracket. The drive bracket comprises a bottom plate, a first side plate, and an opposite second side plate. The first side plate defines a pair of slots in a top portion thereof, and comprises a pair of first positioning pins engaging in positioning holes of one side of a data storage device. The second side plate defines a plurality of through holes, and comprises a catch bar. The cover comprises a main body having a first edge portion and an opposite second edge portion. The first edge portion of the main body comprises a pair of tabs engaging in the first slots of the first side plate of the drive bracket respectively. The second edge portion of the main body comprises a latch hook resiliently engaging with the catch bar, and a pair of second positioning pins extending through the through holes of the drive bracket and engaging in positioning holes of an opposite side of data storage device. The first and second side plates of the drive bracket comprise a plurality of first tongues urging said sides of the data storage device. The data storage device is supported on the bottom plate of the drive bracket. The main body of the cover comprises a plurality of second tongues urging a top of the data storage device. The data storage device is thereby securely retained in the mounting apparatus.

Other objects, advantages and novel features of the present invention will be drawn from the following detailed description of preferred embodiments of the present invention with the attached drawings, in which:

DESCRIPTION OF THE PREFERRED EMBODIMENTS

The present invention will be described in its preferred embodiments, and in conjunction with a data storage device such as an HDD.

Figure 1:
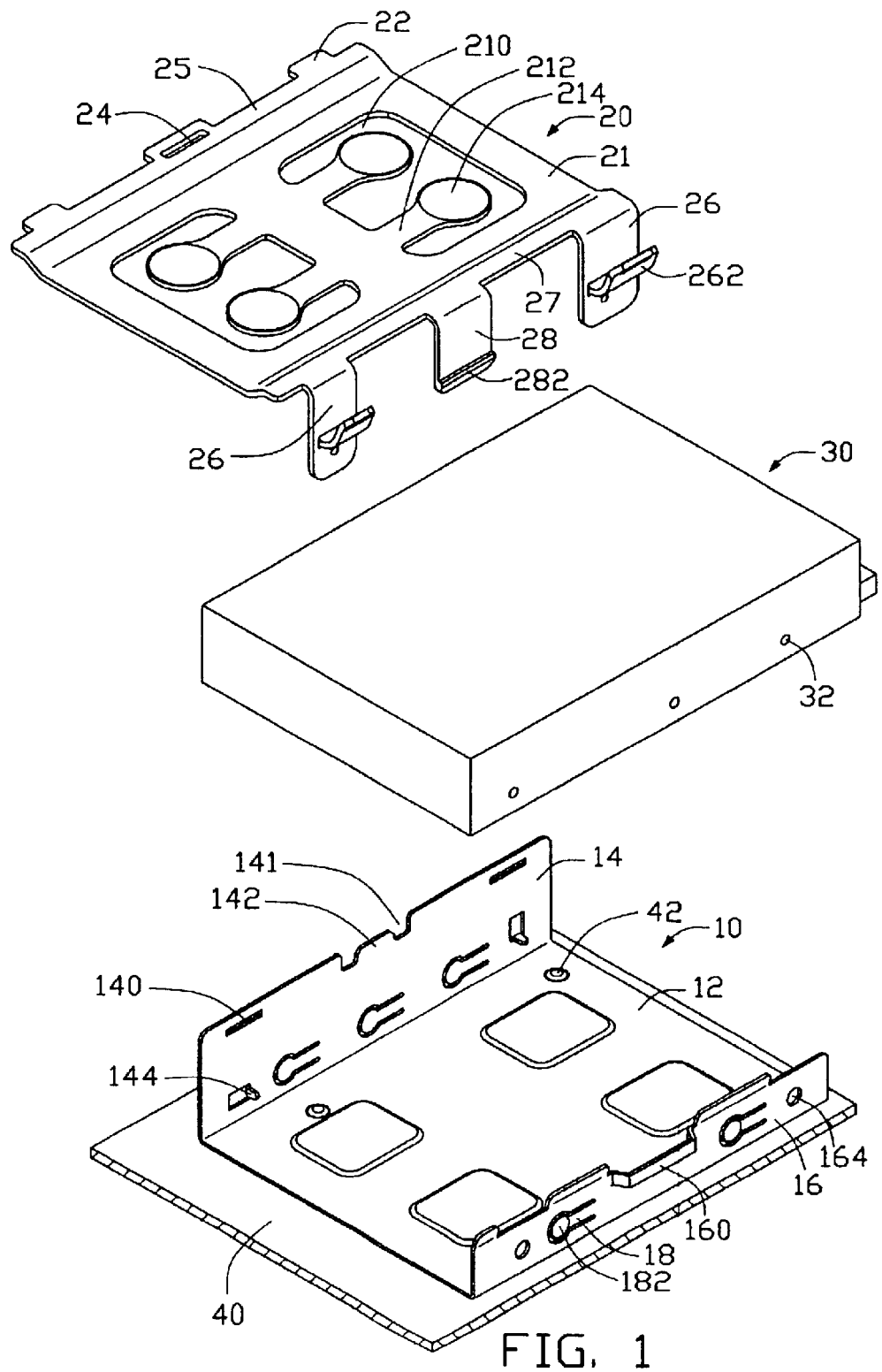
FIG. 1 is an exploded isometric view of a data storage device mounting apparatus in accordance with a preferred embodiment of the present invention, together with a data storage device.
Figure 2:
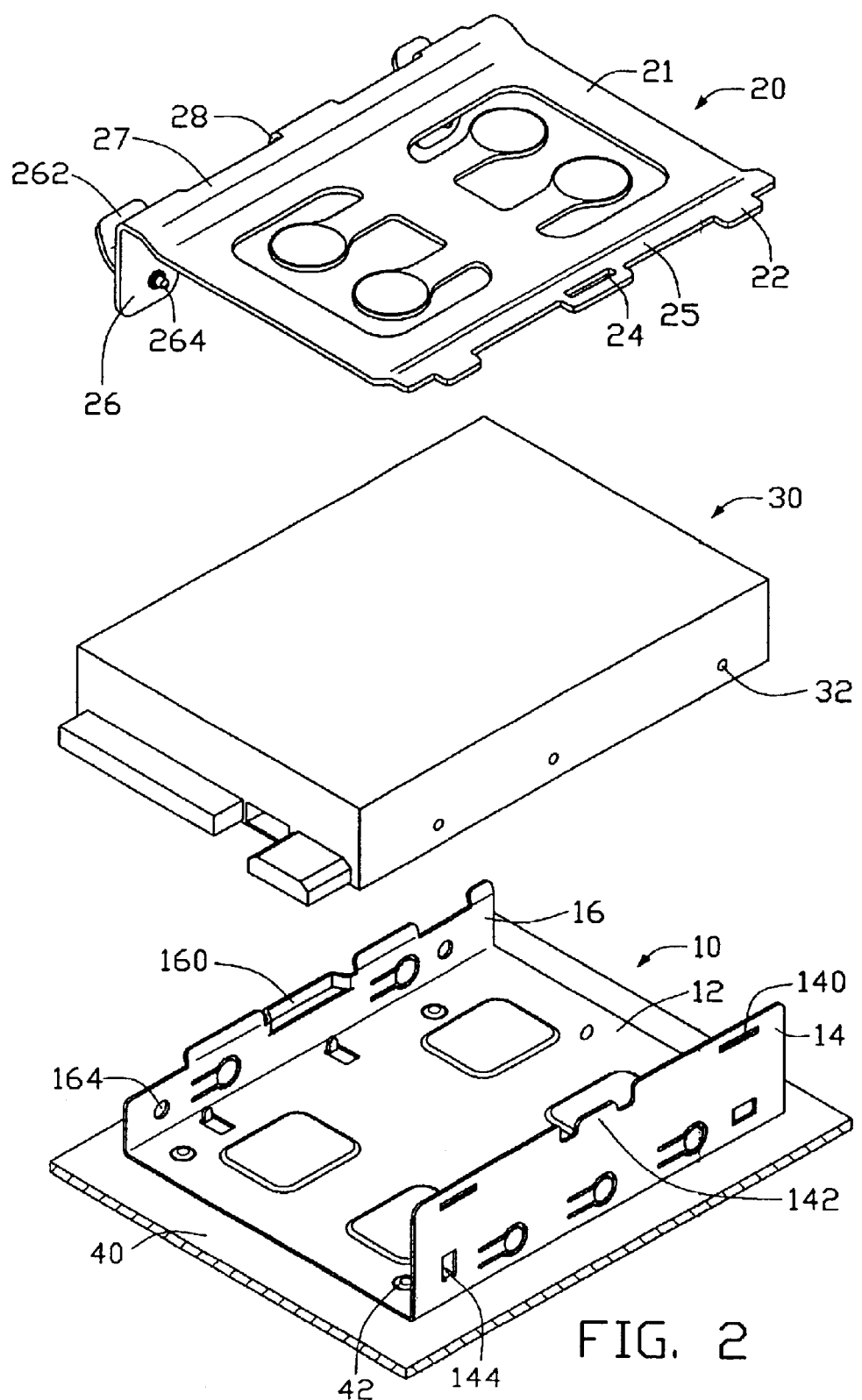
FIG. 2 is similar to FIG. 1, but viewed from another aspect.

FIGS. 1 and 2 show a data storage device mounting apparatus in accordance with a preferred embodiment of the present invention, together with a data storage device 30. The mounting apparatus includes a drive bracket 10 attached to a chassis 40 of a computer (not shown), and a cover 20 for attaching to the drive bracket 10.

The data storage device 30 defines a plurality of positioning holes 32 in each of opposite sides thereof.

The drive bracket 10 is made of metallic material, and is mounted to the chassis 40 with a plurality of rivets 42. The drive bracket 10 comprises a bottom plate 12, and a first side plate 14 and a second side plate 16 extending upwardly from opposite edges of the bottom plate 12 respectively. The bottom plate 12 and first and second side plates 14, 16 cooperatively define a space (not labeled) therebetween for receiving the data storage device 30 therein.

The first side plate 14 defines a pair of notches 141 in a middle of a top edge thereof. A first tab 142 is thus formed between the pair of notches 141. A pair of horizontal first slots 140 is defined near opposite ends of a top portion of the first side plate 14 respectively. Bottom extremities of the notches 141 and the first slots 140 are substantially at a same level. A pair of spaced first positioning pins 144 extends inwardly from a bottom portion of the first side plate 14. The first positioning pins 144 are for engaging in a corresponding pair of the positioning holes 32 of one side of the data storage device 30.

The second side plate 16 defines a pair of through holes 164 corresponding to the first positioning pins 144 of the first side plate 14. A middle of a top edge of the second side plate 16 is stamped outwardly to form a catch bar 160.

Each of the first and second side plates 14, 16 comprises a plurality of aligned first tongues 18. Each first tongue 18 comprises an urging portion 182 at a free end thereof. The urging portion 182 has a convex face that projects beyond an inner face of the respective first or second side plate 14, 16. The urging portions 182 are used to urge the opposite sides of the data storage device 30.

The cover 20 is made of resilient material such as plastic, and comprises a main body 21 having a slightly raised first edge portion 25 and an opposite slightly raised second edge portion 27. A pair of openings 210 is defined in the main body 21. A pair of second tongues 212 extends from a transverse central portion of the main body 21 into each of the openings 210. Each second tongue 212 comprises an urging portion 214 at a free end thereof. The urging portion 214 has a convex face that projects beyond a bottom face of the main body 21. The urging portions 214 are used to urge a top of the data storage device 30.

A pair of second tabs 22 extends coplanarly outwardly from near opposite ends respectively of the first edge portion 25 of the main body 21. The second tabs 22 are for engaging in the first slots 140 of the drive bracket 10. A second slot 24 is defined in a middle of the first edge portion 25, for engagingly receiving the first tab 142 of the drive bracket 10.

A pair of legs 26 depends from respective opposite ends of the second edge portion 27 of the main body 21. Each leg 26 comprises a handle 262 extending outwardly and upwardly, and a second positioning pin 264 extending inwardly. The second positioning pins 264 are used to extend through the through holes 164 of the drive bracket 10 and engage in a corresponding pair of the positioning holes 32 of another side of the data storage device 30. A flange 28 depends from a middle of the second edge portion 27. The flange 28 comprises an outer latch hook 282 at a free end thereof, for resiliently engaging with the catch bar 160 of the drive bracket 10.

Figure 3:
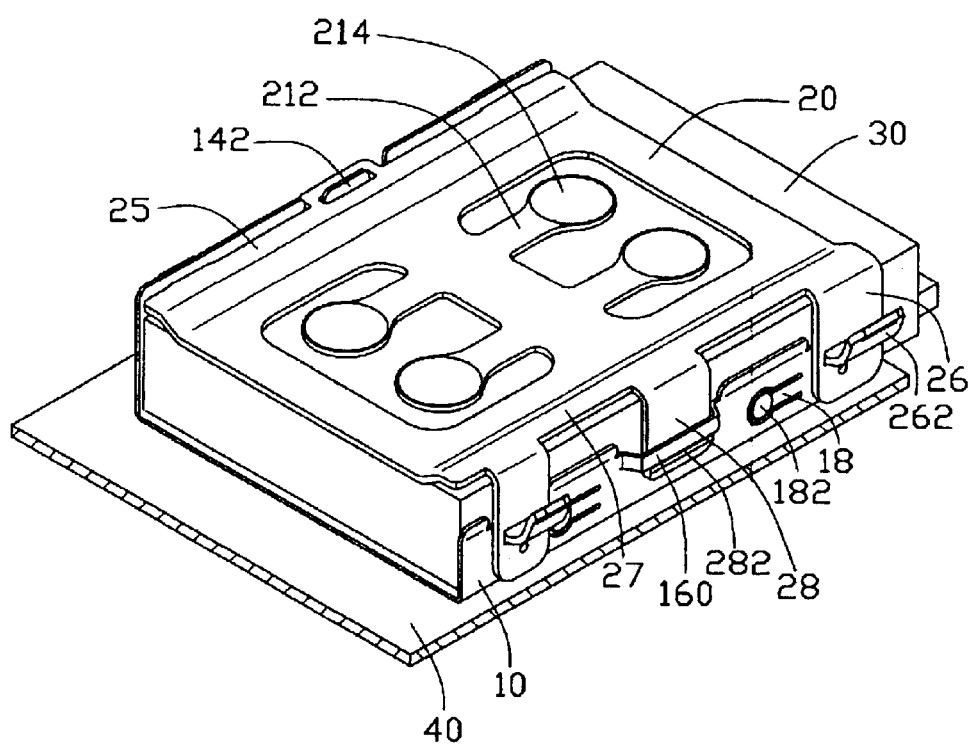
FIG. 3 is an assembled view of FIG. 1, showing the data storage device installed in the mounting apparatus.

Referring to FIG. 3, in assembly, the data storage device 30 is disposed in the space between the bottom plate 12 and the first and second side plates 14, 16 of the drive bracket 10. The first positioning pins 144 of the first side plate 14 are engaged in the corresponding positioning holes 32 of one side of the data storage device 30. The data storage device 30 is thus supported on the bottom plate 12. The urging portions 182 of the first tongues 18 of the first and second side plates 14, 16 urge against the opposite sides of the data storage device 30. The through holes 164 of the second side plate 16 are aligned with the corresponding positioning holes 32 of the other side of the data storage device 30.

Then the first edge portion 25 of the cover 20 is placed adjacent the first side plate 14 of the drive bracket 10, and the second tabs 22 of the first edge portion 25 are aligned with the first slots 140 of the first side plate 14. A middle part of the first edge portion 25 is resiliently deformed slightly upwardly, so that said middle part is disposed slightly higher than the first tab 142 of the drive bracket 10. The cover 20 is moved so that the second tabs 22 are extended through the first slots 140 of the first side plate 14. Said middle part of the first edge portion 25 rides over the first tab 142 until the second slot 24 aligns with the first tab 142, whereupon the first edge portion 25 resiliently returns to its original shape and the first tab 142 is snappingly received in the second slot 24. The first edge portion 25 of the cover 20 is thereby connected to the first side plate 14 of the drive bracket 10.

Finally, the second edge portion 27 of the cover 20 is pressed downwardly, so that the second positioning pins 264 of the legs 26 are extended through the through holes 164 of the second side plate 16 and snappingly engaged in the corresponding positioning holes 32 of the other side of the data storage device 30. Simultaneously, the latch hook 282 of the flange 28 of the cover 20 snappingly engages with the catch bar 160 of the second side plate 16. The urging portions 214 of the second tongues 212 of the cover 20 urge against the top of the data storage device 30. The second edge portion 27 of the cover 20 is thereby secured to the second side plate 16 of the drive bracket 10.

To remove the data storage device 30, the latch hook 282 is pressed inwardly so that it substantially disengages from the catch bar 160, and the handles 262 are pulled outwardly and upwardly so that the second positioning pins 262 disengage away from the positioning holes 32 of the data storage device 30 and the through holes 164 of the second plate 16. Said middle part of the first edge portion 25 of the cover 20 is resiliently deformed slightly upwardly, so that the first tab 142 exits the second slot 24. The cover 20 is pulled away from the first side plate 14 of the drive bracket 10, so that second tabs 22 exit the first slots 140. Finally, the side of the data storage device 30 that abuts the second side plate 16 is lifted up and out of the drive bracket 10, so that the data storage device 30 is released from the first positioning pins 144 of the first side plate 14.

In the mounting apparatus of the present invention, the first positioning pins 144 of the drive bracket 10 and the second positioning pins 264 of the cover 20 are extended into the respective positioning holes 32 of the data storage device 30. Thus, the data storage device 30 is prevented from moving relative to the drive bracket 10 in a first direction, the first direction being parallel to the bottom plate 12 and the first and second side plates 14, 16 of drive bracket 10. In addition, the first tongues 18 of the drive bracket 10 urge against the opposite sides of the data storage device 30. Thus, the data storage device 30 is prevented from moving relative to the drive bracket 10 in a second direction that is perpendicular to the first direction and parallel to the bottom plate 12 of the drive bracket 10. Furthermore, the data storage device 30 is supported on the bottom plate 12, and the second tongues 212 of the cover 20 urge against the top of the data storage device 30. Thus, the data storage device 30 is prevented from moving relative to the drive bracket 10 in a third direction that is perpendicular to both the first and second directions.

In addition, the cover 20 is snappingly attached to the drive bracket 10, and the data storage device 30 is secured in the mounting apparatus without screws. Therefore, the data storage device 30 is conveniently installed into or removed from the mounting apparatus. Moreover, the first tongues 18 urging against the data storage device 30 provide reliable grounding paths for the data storage device 30.

Figure 4:
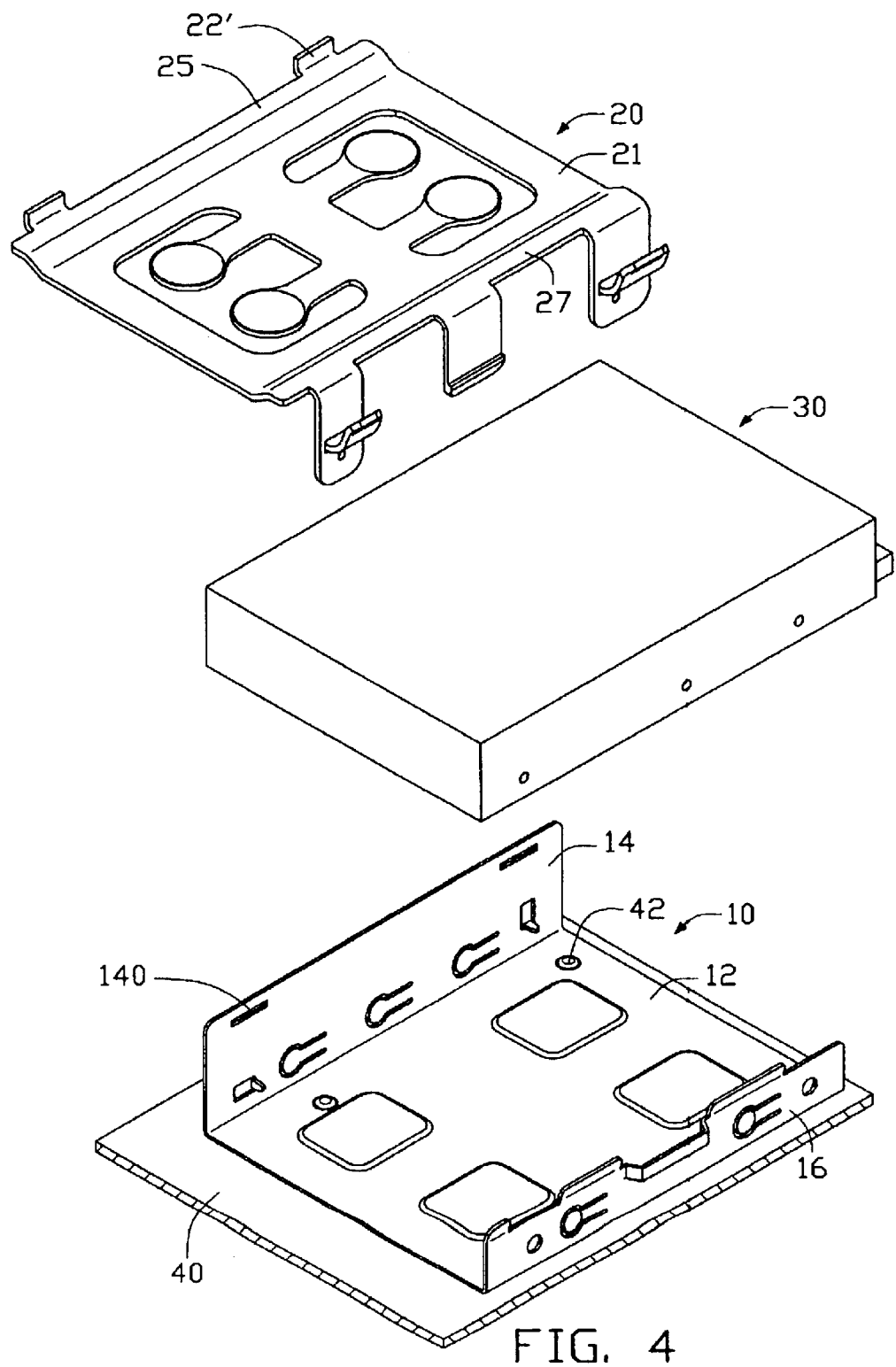
FIG. 4 is an exploded isometric view of a data storage device mounting apparatus in accordance with an alternative embodiment of the present invention, together with a data storage device.

Referring to FIG. 4, in an alternative embodiment of the present invention, the first edge portion 25 of the cover 20 comprises a pair of spaced second tabs 22' extending outwardly and upwardly therefrom. The second tabs 22' are extended through and retained in the first slots 140 of the drive bracket 10.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for mounting a data storage device to a chassis, the data storage device defining a plurality of positioning holes in each of opposite sides thereof, the mounting apparatus comprising:

a drive bracket adapted for receiving the data storage device, and comprising a first side plate and a second side plate, the first side plate defining at least one slot and comprising a plurality of first positioning pins adapted for engaging in corresponding positioning holes of one of the sides of the data storage device, the second side plate defining a plurality of through holes and comprising a catch; and a cover attached on the drive bracket and adapted for securing the data storage device in the drive bracket, the cover comprising:
  a main body adapted for urging a top of the data storage device;
  at least one tab engaging in the at least one slot of the drive bracket;
  a latch engaging with the catch of the drive bracket; and
  a plurality of second positioning pins extending through the through holes of the drive bracket and adapted for engaging in corresponding positioning holes of the other of the sides of the data storage device.

2. The mounting apparatus as described in claim 1, wherein the first and second side plates of the drive bracket comprise a plurality of first tongues, and each of the first tongues comprises a convex urging portion adapted for urging the sides of the data storage device.

3. The mounting apparatus as described in claim 1, wherein the main body of the cover comprises a first edge portion connected to the first side plate of the drive bracket, and a second edge portion connected to the second side plate of the drive bracket.

4. The mounting apparatus as described in claim 3, wherein the main body of the cover comprises a plurality of second tongues, and each of the second tongues comprises a convex urging portion adapted for urging the top of the data storage device.

5. The mounting apparatus as described in claim 3, wherein the at least one tab extends coplanarly from the first edge portion of the cover.

6. The mounting apparatus as described in claim 5, wherein the first side plate of the drive bracket further comprises a tab arranged at a top thereof, and the first edge portion of the cover defines a slot engagingly receiving the tab of the first side plate.

7. The mounting apparatus as described in claim 3, wherein the at least one tab of the cover extends outwardly and upwardly from the first edge portion, and the at least one tab is retained in the at least one slot of the first side plate of the drive bracket.

8. The mounting apparatus as described in claim 3, wherein the second edge portion of the cover comprises a plurality of legs depending therefrom, and the second positioning pins extend inwardly from the legs respectively.

9. The mounting apparatus as described in claim 8, wherein each of the legs comprises a handle extending outwardly and upwardly.

10. The mounting apparatus as described in claim 8, wherein the second edge portion of the cover further comprises a flange depending therefrom, and the latch of the cover is arranged at a free end of the flange.

11. A method of mounting a data storage device to a chassis, the method comprising the steps of:
  providing a drive bracket adapted for receiving the data storage device, the drive bracket comprising a first side plate and a second side plate, the first side plate comprising a plurality of first positioning pins, the second side plate comprising a catch;
  putting the data storage device in the bracket, the first positioning pins of the drive bracket engaging in positioning holes of one side of the data storage device;
  providing a cover for securing the data storage device in the drive bracket, the cover comprising a main body having a first edge portion and a second edge portion, the second edge portion comprising a latch and a plurality of second positioning pins;
  attaching the first edge portion of the main body of the cover to the first side plate of the drive bracket; and
  attaching the second edge portion of the main body of the cover to the second side plate of the drive bracket, the second positioning pins engaging in positioning holes of an opposite side of the data storage device, the latch of the cover engaging with the catch of the drive bracket.

12. The method as described in claim 11, wherein the first side plate of the drive bracket defines at least one slot, and the first edge portion of the cover comprises at least one tab engaging in the at least one slot.

13. The method as described in claim 11, wherein the drive bracket comprises a plurality of first tongues, and each of the first tongues comprises a convex urging portion adapted for urging said sides of the data storage device.

14. The method as described in claim 13, wherein the main body of the cover comprises a plurality of second tongues, and each of the second tongues comprises a convex urging portion adapted for urging a top of the data storage device.

15. An assembly comprising:
  a drive bracket defining opposite first and second side plates, one of said first and second side plates including positioning pins, the other of said first and second side plates including through holes,
  said one of said first and second side plates further including a retaining slot, and said other including a catching bar;
  a cover attached to the bracket, said cover defining on one side thereof retaining tab received in said retaining slot, and a latch hook on the other side to be releasbly latchably engaged with the catching bar; and
  said cover further including positioning rods extending through the through holes of the bracket.

16. The assembly as described in claim 15, further including a data storage device received in a space defined between said bracket and said cover, and including retaining holes on two sides receiving the corresponding positioning pins and the positioning rods, respectively.

* * * * *